3,210,358
SUBSTITUTED 4-AMINO CARBOSTYRILS
Rudolf Pfister and Alfred R. Sallmann, both of Basel, Switzerland, assignors to Geigy Chemical Corporation, Ardsley, N.Y., a corporation of Delaware
No Drawing. Original application Aug. 9, 1961, Ser. No. 130,253, now Patent No. 3,178,434, dated Apr. 14, 1965. Divided and this application June 4, 1964, Ser. No. 380,114
Claims priority, application Switzerland, Aug. 10, 1960, 9,030/60
4 Claims. (Cl. 260—288)

This is a division of application Serial No. 130,253, filed August 9, 1961, now U.S. Patent Number 3,178,434.

The present invention concerns new carbostyril derivatives which can be used in particular as pharmaceuticals and intermediate products for the production of same.

Carbostyril derivatives of the general formula

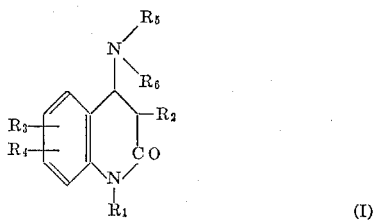

(I)

wherein $R_1$ represents a hydrocarbon radical having 1 to 10 carbon atoms, aryl nuclei which can be substituted by halogen or low alkoxy radicals, or it is a polymethyleneiminoalkyl, morpholinoalkyl or a low dialkylaminoalkyl group, $R_2$ represents hydrogen or a hydrocarbon radical having 1 to 10 carbon atoms, in particular a low alkyl, aryl or low aralkyl radical, $R_3$ represents hydrogen, a halogen atom, a low alkyl or alkoxy group, the nitro group, cyano group or trifluoromethyl group, $R_4$ represents hydrogen, a halogen atom or a low alkyl or alkoxy group or, together with $R_3$, the methylenedioxy group, $R_5$ and $R_6$ are bound directly to each other and, with the adjoining nitrogen atom, stand for the ethyleneimino, pyrrolidyl-(1), piperidino, hexamethyleneimino or heptamethyleneimino radical, have not been known up to now.

The preferred compounds are embraced by the following general formula

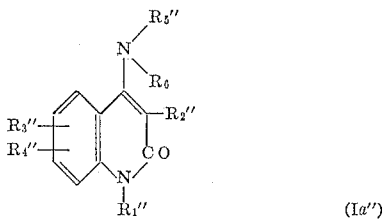

(Ia'')

wherein $R_1''$ represents a low alkyl radical, in particular the methyl radical or an aryl radical, in particular the phenyl radical, which can be substituted by halogen, in particular chlorine or by low alkyl or alkoxy radicals, in particular the methyl or methoxy radical, $R_2''$ represents hydrogen or a low alkyl radical, in particular the methyl radical, $R_3''$ represents hydrogen, a halogen atom in particular chlorine, a low alkyl or alkoxy group in particular the methyl or methoxy group, the nitro or trifluoromethyl group, all in the 6- or 7-position, $R_4''$ represents hydrogen, a halogen atom in particular chlorine, a low alkyl or alkoxy group in particular the methyl or methoxy group or, together with $R_3$, the methylenedioxy group, all in the 6- or 7-position, $R_5''$ represents hydrogen or a hydrocarbon radical with 1–10 carbon atoms which can be substituted at aryl nuclei by halogen or low alkoxy radicals, and $R_6$ represents hydrogen or a low alkyl radical.

Groups having 1 to 4 carbon atoms are meant by the term "low" in connection with alkyl (or aralkyl or dialkylamino) and alkoxy in the definitions of $R_1$, $R_2$, $R_3$, $R_4$, $R_5$ and $R_6$.

In connection with the radicals polymethyleneiminoalkyl, morpholinoalkyl and aminoalkyl, the term "low" means an alkyl group having 2 to 4 carbon atoms. "Poly" in the term "polymethyleneiminoalkyl" means a number in the range of 5 or 6. The term "halogen" embraces the elements fluorine, chlorine and bromine.

It has now surprisingly been found that these compounds and their salts with inorganic or organic acids have valuable pharmacological properties, in particular analgetic, antiphlogistic and antipyretic activity. They are suitable, for example, for the alleviation of pain and for the treatment of rheumatic complaints for which purposes they are administered per os or parenterally. The compounds according to the invention can be administered per os, with or without the usual suitable carriers or fillers, in the form of powders, tablets or capsules or other usual forms. For injection, the compounds according to the invention can be used in the form of the free base or in the form of non-toxic salts dissolved in water or in other suitable solvents such as, e.g. dilute acid and, if desired, mixed with other usual carriers.

In the compounds of the general Formula I $R_1$ is, for example, an alkyl radical such as e.g. the methyl, ethyl, n-propyl, isopropyl, n-amyl, isoamyl, n-hexyl or n-decyl radical; an alkenyl radical such as e.g. the allyl, β-methallyl or crotyl radical; the propargyl radical; a cycloalkyl radical such as e.g. the cyclopentyl, cyclohexyl or cycloheptyl radical; an aromatic radical such as e.g. the phenyl, o-tolyl, m-tolyl, p-tolyl, p-methoxyphenyl, p-ethoxyphenyl, p-butoxyphenyl, m-chlorophenyl, p-chlorophenyl, p-fluorophenyl or p-bromophenyl radical; or an araliphatic radical such as e.g. the benzyl, p-methylbenzyl, o-methylbenzyl, p-methoxybenzyl, 3,4-dimethoxybenzyl, p-chlorobenzyl, p-bromobenzyl, β-phenylethyl or γ-phenylpropyl or δ-phenylbutyl radical; a dialkylaminoalkyl radical such as e.g. the β-dimethylaminoethyl, γ-dimethylaminopropyl, δ-dimethylaminobutyl, β-diethylaminoethyl, γ-diethylaminopropyl or β-dibutylaminoethyl radical; the pentamethyleneiminobutyl radical, the hexamethyleneiminoethyl radical, the morpholinoethyl radical, the morpholinobutyl radical or hydrogen.

$R_2$ can be, for example, one of the hydrocarbon radicals given under $R_1$.

Examples of ring substituents $R_3$ and $R_4$ are chlorine, bromine or fluorine atoms, methyl, ethyl, isopropyl and n-butyl radicals, methoxy, ethoxy, n-propoxy, isopropoxy and n-butoxy radicals as well as the radicals specifically given in the definition for $R_3$ and $R_4$.

$R_5$ and $R_6$ together with the adjoining nitrogen atom can be, for example, the ethyleneimino, pyrrolidyl-(1), piperidino, hexamethyleneimino or heptamethyleneimino radical.

To produce compounds of the general Formula I, compounds of the general formula

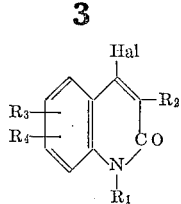

(II)

wherein Hal represents chlorine or bromine and $R_1$, $R_2$, $R_3$ and $R_4$ have the meanings given above are reacted with ammonia or amines of the general formula

(III)

wherein $R_5$ and $R_6$ have the meanings given above.

Compounds of the following three general formulae, among others,

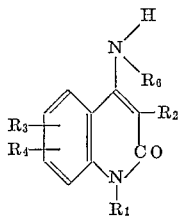

(Ia)

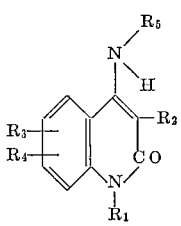

(Ib)

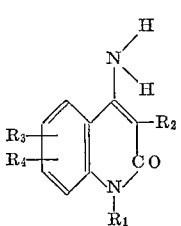

(Ic)

are embraced by the compounds of the general Formula I obtained by the process described above. These three types of compounds can be subsequently converted into other compounds of the general Formula I by reaction with a reactive ester of a compound of the general formula $$R_5'\text{—OH} \qquad (IV)$$

or/and by reaction with a reactive ester of a compound of the general formula $$R_6'\text{—OH} \qquad (V)$$

in the presence of an acid binding agent. In Formulae IV and V, $R_5'$ and $R_6'$ have the meanings given above for $R_5$ and $R_6$ with the exception of hydrogen. The compounds of types Ia, Ib and Ic embraced by the general Formula I can also be converted into other corresponding compounds of the general Formula I by reaction with low oxoalkanes under reducing conditions or by reaction with diazomethane.

Provided that in the above process the substituent $R_2$ is not hydrogen but a radical of the alkyl, aryl or aralkyl series, the first step of the reaction sometimes so proceeds that on using dialkylamines of the general Formula III, a mixture of the primary unsubstituted and secondary monoalkyl-substituted amine of the general Formula I is formed. The primary and secondary amines of the general Formula I so obtained can be converted in a second reaction step by the alkylation process described above into the secondary and tertiary amines of the general Formula I possibly required. If desired, the compounds of the general Formula I are converted into their salts with inorganic or organic acids. Acids suitable for salt formation are, e.g. hydrochloric acid, hydrobromic acid, phosphoric acid, sulphuric acid, methane sulphonic acid, ethane disulphonic acid, acetic acid, lactic acid, succinic acid, maleic acid, fumaric acid, malic acid, tartaric acid, citric acid, benzoic acid, phthalic acid, salicylic acid and mandelic acid. Compounds of the general Formula II can be obtained from correspondingly substituted 4-hydroxycarbostyrils.

Various 4-hydroxycarbostyril derivatives are known and numerous others can be produced in an analogous manner. These compounds can be converted into starting materials of the general Formula II by treatment with a mineral acid chloride or bromide, e.g. $POCl_3$, $PBr_3$, $PCl_5$, $SOCl_2$.

The compounds of the general Formula II, in particular those having a radical $R_2$ which is not hydrogen, are valuable starting materials not only for the reaction according to the invention but also for the synthesis of other pharmacologically active substances. The reactions of compounds of the general Formula II with amines of the general formula III are performed at temperatures of about 80–250° C. in the presence or absence of solvents and diluents such as, e.g. ethanol or phenyl, as well as of catalysts such as, e.g. copper powder, sodium or potassium iodide. The components are sometimes reacted in an autoclave depending on the temperature necessary for the reaction and on the boiling point of the amine to be reacted and of any solvent used. When the modified process described above is used, the reaction is performed in an organic solvent in an autoclave at temperatures of over 220° C. If necessary, an excess of the amine to be reacted serves to bind the hydrogen halide liberated.

Compounds of the general Formula I are obtained by another process by reacting compounds of the general formula

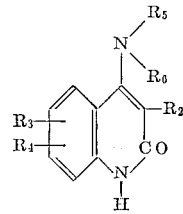

(VI)

or their tautomeric form

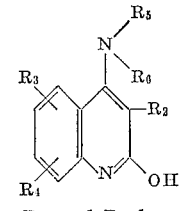

(VIa)

wherein $R_2$, $R_3$, $R_4$, $R_5$ and $R_6$ have the meanings given above, in the presence of an acid binding agent, with reactive esters of compounds of the general formula $$R_1'\text{—OH} \qquad (VII)$$

wherein $R_1'$ represents a radical corresponding to the definition given above for $R_1$ with the exception of aromatic radicals, or by reacting such compounds of general Formulae VI or VIa after conversion into salts of metals with reactive esters of compounds of the general Formula VII or by reacting them with a diazo alkane. The reactions are performed by dissolving the compounds of general Formula VI for example in methanolic or ethanolic potash lye or caustic soda lye, gradually adding the necessary reactive ester such as, e.g. methyl iodide, ethyl iodide, n-butyl bromide, allyl bromide, methallyl bromide, benzyl chloride, dimethyl sulphate or diethyl sulphate, and heating the mixture, for example, under reflux or to higher temperatures in an autoclave.

Some starting materials of the general Formula VI are known and others can be produced in the known manner, e.g. by heating possibly substituted 2,4-dioxoquinoline with suitable monoamides or diamines.

The following examples further illustrate the performance of the process according to the invention without limiting it in any way. Parts are given therein as parts by weight and their relationship to parts by volume is as that of grammes to cubic centimetres. The temperatures are in degrees centigrade.

*Example 1*

370 parts of 1-methyl-4-chloro-carbostyril and 620 parts of 50% anhydrous ethanolic dimethylamine are heated for 15 hours in an autoclave at 150°. Aften cooling and evaporation of the solvent, the residue is extracted with ether, the extract is filtered and the 1-methyl-4-dimethylamino-carbostyril which crystallises out of the filtrate on cooling is filtered off under suction. It is obtained as needles which melt at 50–55°. After recrystallising from ether, white crystals which melt at 58° are obtained. The hydrochloride melts at 172°. On using ethanolic methylamine solution, 1-methyl - 4 - methylamino-carbostyril is obtained in an analogous manner. M.P. 230–232°.

On using suitable starting materials, the following compound is obtained by the process described in the above example: 1-phenyl - 3 - benzyl-4-β-dimethylaminoethylamino-carbostyril, M.P. 110–111° (from ether).

*Example 2*

180 parts of piperidine are added while cooling to 90 parts of 1-methyl-4-chloro-carbostyril and the solution is heated for 24 hours at 80°. After cooling, the piperidine hydrochloride which separates in crystalline form is filtered off under suction and the filtrate is evaporated to dryness in vacuo. The residue is crystallised from methanol/ether, whereupon 1-methyl-4-piperidino-carbostyril is obtained as white needles which melt at 99–101°.

The following compounds are obtained by the process described in the above example:

1-methyl-4-pentamethyleneiminopropylamino-carbostyril,
1-methyl-4-morpholinoethylamino-carbostyril,
1-methyl-4-ethyleneimino-carbostyril,
1-methyl-4-heptamethyleneimino-carbostyril.

*Example 3*

15 parts of 1-methyl-4-chloro-carbostyril and 50 parts of 50% anhydrous ethanolic γ-diethylamino-propylamine are heated for 15 hours in an autoclave at 120°. After cooling, the solution is concentrated and the residue is extracted with ether. The ether extract is shaken with water and 2 N-hydrochloric acid. The hydrochloric acid extract is made alkaline with 2 N-caustic soda lye and the base which precipitates is taken up in ether. After evaporation of the ether, a yellow oil remains which is distilled at 205° under 0.01 torr. The 1-methyl-4-(γ-diethylamino-propylamino)-carbostyril is crystallised from ether and then melts at 73°.

The diphosphate is produced by adding 2 mols of phosphoric acid (85%) to the base in boiling alcohol whereupon the salt separates in crystalline form. M.P. 160°.

On using the corresponding starting materials, the following compound is obtained by the process described in the above example: 1-methyl-4-(γ-diethylamino-propylamino)-7-chloro-carbostyril, M.P. 129–131°.

*Example 4*

20 parts of γ-dimethylamino-propylamine are added at 100° while stirring to a mixture of 10 parts of 1-methyl-3-phenyl-4-chloro-carbostyril, 20 parts of phenol and some sodium iodide. The mixture is then stirred for 15 hours at 175°, cooled and made alkaline with 35% caustic soda lye while stirring. The mixture is then extracted with ether and the base is isolated by repeated extraction of the ether with 2 N-hydrochloric acid. The acid extract is made alkaline with dilute caustic soda lye and the oil which separates is dissolved in ether. The ether extract is dried over potassium carbonate and concentrated whereupon 1 - methyl - 3 - phenyl-4-[γ-dimethylamino-propylamino]-carbostyril remains as an oil. On recrystallising from ethanol it melts at 121°.

The following compounds are obtained by the process described in the above example:

1-methyl-4-δ-dimethylaminobutylamino-carbostyril,
1-methyl-4-β-dibutylaminoethylamino-carbostyril.

What we claim is:

1. A carbostyril derivative selected from the group consisting of a compound of the formula

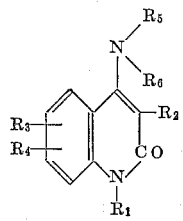

wherein
$R_1$ represents a member selected from the group consisting of lower alkyl, phenyl, chloro-phenyl, lower alkyl-phenyl and lower alkoxy-phenyl,
$R_2$ represents a member selected from the group consisting of hydrogen and lower alkyl,
$R_3$ represents a member in one of the positions 6 and 7 which is selected from the group consisting of hydrogen, chlorine, lower alkyl, lower alkoxy, nitro and trifluoromethyl,
$R_4$ represents a member in one of the positions 6 and 7 which is selected from the group consisting of hydrogen, chlorine, lower alkyl and lower alkoxy, and
$R_3$ and $R_4$ taken together represent the methylene-dioxy group in 6,7-position, and
$R_5$ and $R_6$ taken jointly with the corresponding nitrogen atom represent a member selected from the group consisting of ethyleneimino, pyrrolidyl, piperidino, hexamethyleneimino and heptamethyleneimino.

2. 1-phenyl - 3 - benzyl-4-β-dimethylaminoethylamino-carbostyril.

3. 1-methyl - 4 - γ-diethylaminopropylamino-7-chloro-carbostyril.

4. 1-methyl-4-piperidino-carbostyril.

No references cited.

NICHOLAS S. RIZZO, *Primary Examiner.*